United States Patent
Tran et al.

(10) Patent No.: US 12,029,223 B2
(45) Date of Patent: Jul. 9, 2024

(54) CONTROL OF FROZEN BEVERAGE DISPENSER

(71) Applicant: THE COCA-COLA COMPANY, Atlanta, GA (US)

(72) Inventors: Son Van Tran, Alpharetta, GA (US); Alan L. Hawkins, Conyers, GA (US)

(73) Assignee: The Coca-Cola Company, Atlanta, GA (US)

( * ) Notice: Subject to any disclaimer, the term of this patent is extended or adjusted under 35 U.S.C. 154(b) by 383 days.

(21) Appl. No.: 17/428,371

(22) PCT Filed: Feb. 6, 2020

(86) PCT No.: PCT/US2020/016920
§ 371 (c)(1),
(2) Date: Aug. 4, 2021

(87) PCT Pub. No.: WO2020/163551
PCT Pub. Date: Aug. 13, 2020

(65) Prior Publication Data
US 2022/0211072 A1   Jul. 7, 2022

Related U.S. Application Data

(60) Provisional application No. 62/845,972, filed on May 10, 2019, provisional application No. 62/802,082, filed on Feb. 6, 2019.

(51) Int. Cl.
*A23G 9/12* (2006.01)
*A23G 9/04* (2006.01)
*A23G 9/22* (2006.01)

(52) U.S. Cl.
CPC ............... *A23G 9/12* (2013.01); *A23G 9/045* (2013.01); *A23G 9/224* (2013.01); *A23G 9/228* (2013.01)

(58) Field of Classification Search
CPC .......... A23G 9/12; A23G 9/045; A23G 9/224; A23G 9/228; A23G 9/28; A23G 9/22;
(Continued)

(56) References Cited

U.S. PATENT DOCUMENTS 3,298,190 A * 1/1967 Harker .................. A23G 9/228
62/342
5,205,129 A   4/1993 Wright et al.
(Continued)

FOREIGN PATENT DOCUMENTS

CN     102165498 A    8/2011
EP       0382275 A1   8/1990
(Continued)

OTHER PUBLICATIONS

English Summary of Chinese Office Action issued in 202080012434.7, mailed Mar. 9, 2023.
(Continued)

*Primary Examiner* — Ana M Vazquez
(74) *Attorney, Agent, or Firm* — Meunier Carlin & Curfman LLC

(57) ABSTRACT

A frozen product dispenser provides a controller to control the rate of freezing and the temperature range of a frozen product. The controller monitors the temperature of the product as well as the torque applied to a scrapper blade. For example, the torque may be measured based on monitoring a current draw of a scrapper motor. The torque may be tracked over time to determine a rate of change in the torque. The rate of freezing may be controlled by setting a maximum rate of increase in the torque. Upon determining that the rate of increase in the monitored torque exceeds the maximum rate, a compressor for the frozen product dispenser may be turned off for a predetermined period of time and/or a hot gas bypass may be opened. A heat transfer
(Continued)

medium may decouple thermal contact between an evaporator and the product to control the rate of freezing.

19 Claims, 9 Drawing Sheets

(58) Field of Classification Search
CPC .. B67D 1/0858; B67D 1/0884; B67D 1/1202; B67D 2001/0093; B67D 2210/0016
See application file for complete search history.

(56) References Cited

U.S. PATENT DOCUMENTS

| | | | |
|---|---|---|---|
| 5,967,226 A | 10/1999 | Choi | |
| 6,490,872 B1 | 12/2002 | Beck et al. | |
| 6,546,843 B2 | 4/2003 | Ugolini | |
| 6,637,214 B1* | 10/2003 | Leitzke | A23G 9/163 62/342 |
| 6,679,314 B2 | 1/2004 | Frank | |
| 6,705,106 B1 | 3/2004 | Cunha et al. | |
| 2002/0033021 A1* | 3/2002 | Frank | F25C 1/147 62/352 |
| 2004/0060306 A1 | 4/2004 | Cunha et al. | |
| 2004/0079095 A1* | 4/2004 | Bischel | F25B 47/022 62/196.4 |
| 2005/0229622 A1 | 10/2005 | Franck et al. | |
| 2006/0070394 A1* | 4/2006 | Boyer | A23G 9/045 62/392 |
| 2008/0149655 A1 | 6/2008 | Gist et al. | |
| 2008/0202130 A1 | 8/2008 | Kadyk | |
| 2010/0326106 A1 | 12/2010 | Hsu et al. | |
| 2011/0186591 A1 | 8/2011 | Pfister | |
| 2012/0312049 A1 | 12/2012 | Downs et al. | |
| 2018/0106515 A1 | 4/2018 | Cobabe et al. | |

FOREIGN PATENT DOCUMENTS

| | | |
|---|---|---|
| EP | 2082649 A2 | 7/2009 |
| EP | 3062630 A1 | 9/2016 |
| JP | 3208296 U | 1/2017 |
| WO | 2008074994 A1 | 6/2008 |

OTHER PUBLICATIONS

International Search Report issued in PCT/US2020/016920, mailed Jun. 9, 2020.
Extended European Search Report issued in EP Application No. 20752089.1, mailed Oct. 7, 2022.
English translation of Chinese Office Action issued in CN Application No. 2020800124347, mailed Sep. 7, 2023.
English translation of Office Action issued in Japanese Application No. 2021-532827, mailed Jan. 16, 2024.

* cited by examiner

CONTROL OF FROZEN BEVERAGE DISPENSER

CROSS-REFERENCE TO RELATED APPLICATIONS

This application is a National Stage of International Application No. PCT/US2020/016920, filed Feb. 6, 2020, which claims the benefit of U.S. Provisional Application Ser. No. 62/845,972 filed May 10, 2019 and U.S. Provisional Application Ser. No. 62/802,082 filed Feb. 6, 2019, the disclosures of which are expressly incorporated herein by reference.

BACKGROUND

Frozen beverages are produced via devices that freeze a mixture of ingredients including syrup, water, and optionally, carbon dioxide in a mixing chamber. The mixture freezes on the inner surface of the mixing chamber, which is surrounded by a helical coil through which a refrigerant passes. A rotating shaft is disposed inside the chamber, which has a plurality of outwardly projecting blades that scrape the frozen mixture off the inside wall of the mixing chamber. Once the beverage is in the desired frozen state, the product is dispensed from the chamber through a product valve.

Current frozen beverage products are generally limited to full-calorie frozen beverages. Caloric products contain common sugars, such as sucrose or high fructose corn syrup ("HFCS"), which are used as sweeteners. These sugars play an important part in the freezing point depression of frozen beverages. Under normal operating conditions of frozen beverage machines, the addition of caloric sweeteners depresses the freezing point of the product, making them dispensable in a slush-like state. By contrast, a diet beverage—or non-caloric beverage—contains no common sugars such as sucrose or corn syrup, and thus lacks a freezing point depressant. Without this modified freezing point, diet syrup freezes into blocks of ice in a conventional frozen beverage machine.

Brix value is generally defined as the percent of soluble solids made up of sugars. A solution having a standard brix value, for example, greater than 10 degrees Brix, generally tends to be sweeter and may be difficult to freeze. On the other hand, a beverage having a low brix value, for example, less than 10 degrees Brix, may more readily freeze harder and faster than a standard brix solution. Since the brix value of diet or low-calorie beverages typically ranges from about 3.5 to about 5.0, commercial success for dispensing diet or low-calorie frozen beverages has been minimal.

In some conventional frozen beverage machines for diet, low-calorie, and reduced-calorie beverages, the freezing point of the syrup is depressed by the addition of freezing point suppression ingredients, such as erythritol, sodium, potassium chloride, or any other food grade freezing point suppressant. A frozen beverage machine capable of producing a diet or low-calorie frozen beverage, which has a brix value of less than about 10, while having the consistency of a full-calorie frozen beverage (i.e., without large pieces of ice) has been elusive.

SUMMARY

In a first aspect of the disclosure, a frozen product dispenser comprises a product barrel configured to receive a product solution. The frozen product dispenser comprises a refrigeration system coupled to the product barrel and configured to cool the product solution within the product barrel. The frozen product dispenser comprises a temperature sensor configured to measure a temperature of the product solution within the product barrel. The frozen product dispenser comprises a drive motor configured to rotate a scrapper blade within the product barrel. The frozen product dispenser comprises a torque sensor configured to measure a torque applied by the drive motor. The frozen product dispenser comprises a control unit configured to control operation of the refrigeration system based on the measured temperature and the measured torque.

In some implementations of the first aspect of the disclosure, the control unit is configured to limit a rate of change of the measured torque to a configured rate of change in torque.

In some implementations of the first aspect of the disclosure, the control unit is configured to limit a rate of change of freezing the product solution within the product barrel to a configured rate of change of freezing.

In some implementations of the first aspect of the disclosure, the torque sensor is a current sensor configured to measure an amount of current drawn by the drive motor.

In some implementations of the first aspect of the disclosure, the control unit is configured to control operation of a compressor of the refrigeration system. The control unit is configured to turn off the compressor when a determined rate of change in the measured torque exceeds a configured rate of change. The control unit is further configured to wait for a configured delay period after turning off the compressor.

In some implementations of the first aspect of the disclosure, the product solution has a Brix value less than 10.

In some implementations of the first aspect of the disclosure, the refrigeration system comprises a hot gas bypass configured to supply gas output from the compressor to an input of an evaporator line. The hot gas bypass comprises a shut-off valve configurable between an open and closed position, wherein the control unit is configured to instruct the shut-off valve to open or close based on the measured torque.

In some implementations of the first aspect of the disclosure, the refrigeration system further comprises a temperature sensor on the evaporator line, wherein the control unit is configured to instruct the shut-off valve to close upon a determination that a temperature measured by the temperature sensor on the evaporator line exceeds a threshold temperature.

In a second aspect of the disclosure, a method of controlling a frozen product dispenser comprises operating a refrigeration system to cool a product solution in a product barrel. The method comprises operating a drive motor to rotate a scrapper blade within the product barrel. The method comprises measuring, by a temperature sensor, a temperature of the product solution within the product barrel. The method comprises measuring, by a torque sensor, a torque applied by the drive motor. The method comprises controlling, by a control unit of the frozen product dispenser, operation of the refrigeration system based on the measured temperature and the measured torque.

In some implementations of the second aspect of the disclosure, the control unit is configured to limit a rate of change of the measured torque to a configured rate of change in torque.

In some implementations of the second aspect of the disclosure, the control unit is configured to limit a rate of change of freezing the product solution within the product barrel to a configured rate of change of freezing.

In some implementations of the second aspect of the disclosure, the torque sensor is a current sensor configured to measure an amount of current drawn by the drive motor.

In some implementations of the second aspect of the disclosure, controlling operation of the refrigeration system comprises controlling operation of a compressor of the refrigeration system.

In some implementations of the second aspect of the disclosure, controlling operation of the refrigeration system comprises turning off the compressor when a determined rate of change in the measured torque exceeds a configured rate of change.

In some implementations of the second aspect of the disclosure, controlling operation of the refrigeration system comprises waiting for a configured delay period after turning off the compressor.

In some implementations of the second aspect of the disclosure, the product solution has a Brix value less than 10.

In some implementations of the second aspect of the disclosure, controlling operation of the refrigeration system comprises controlling operation of a hot gas bypass to supply gas output from the compressor to an input of an evaporator line.

In some implementations of the second aspect of the disclosure, controlling operation of the hot gas bypass comprises instructing a shut-off valve to open based on the measured torque.

In some implementations of the second aspect of the disclosure, controlling operation of the hot gas bypass further comprises instructing the shut-off valve to close based on a measured temperature of the evaporator line exceeding a threshold temperature.

In a third aspect of the disclosure, a frozen product dispenser comprises, a product barrel configured to receive a product solution, the product barrel comprising a heat transfer surface configured to directly contact the product solution. A heat transfer chamber is coupled to the heat transfer surface and comprises a heat transfer medium. A refrigeration system is coupled to the heat transfer chamber and configured to cool the heat transfer medium within the heat transfer chamber. A first temperature sensor is configured to measure a temperature of the product solution within the product barrel. A second temperature sensor is configured to measure a temperature of the heat transfer medium. A drive motor configured to rotate a scrapper blade within the product barrel. A control unit is configured to control operation of the refrigeration system based on the measured temperature of the product and the measured temperature of the heat transfer medium.

In some implementations of the third aspect of the disclosure, the heat transfer medium is a fluid with a freezing point lower than an operating temperature of the refrigeration system.

In some implementations of the third aspect of the disclosure, a freezing point of the product is higher than the freezing point of the heat transfer fluid.

In some implementations of the third aspect of the disclosure, the control unit is configured to control operation of the refrigeration system to maintain the heat transfer medium at a cooling temperature.

In some implementations of the third aspect of the disclosure, the cooling temperature is a function of time or temperature of the product.

In some implementations of the third aspect of the disclosure, the control unit is configured to turn on a compressor of the refrigeration system based on the temperature of the product and configured to turn off the compressor based on the temperature of the heat transfer medium.

In some implementations of the third aspect of the disclosure, the control unit is further configured to wait for a configured delay period after turning off the compressor.

In a fourth aspect of the disclosure, a method of controlling a frozen product dispenser comprises operating a refrigeration system to cool a heat transfer medium surrounding a product barrel. The product barrel comprising a heat transfer surface in direct contact with a product solution in the product barrel. The method comprises operating a drive motor to rotate a scrapper blade within the product barrel. The method comprises measuring, by a first temperature sensor, a temperature of the product solution within the product barrel. The method comprises measuring, by a second temperature sensor, a temperature of the heat transfer medium. The method comprises controlling, by a control unit of the frozen product dispenser, operation of the refrigeration system based on the measured first temperature and the measured second temperature.

In some implementations of the fourth aspect of the disclosure, the heat transfer medium is a fluid with a freezing point lower than an operating temperature of the refrigeration system.

In some implementations of the fourth aspect of the disclosure, a freezing point of the product is higher than the freezing point of the heat transfer fluid.

In some implementations of the fourth aspect of the disclosure, controlling operation of the refrigeration system comprises maintaining the heat transfer medium at a cooling temperature.

In some implementations of the fourth aspect of the disclosure, the cooling temperature is a function of time or temperature of the product.

In some implementations of the fourth aspect of the disclosure, controlling operation of the refrigeration system comprises turning on a compressor of the refrigeration system based on the temperature of the product. Controlling operation of the refrigeration system further comprises turning off the compressor based on the temperature of the heat transfer medium.

In some implementations of the fourth aspect of the disclosure, the method further comprises waiting for a configured delay period after turning off the compressor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
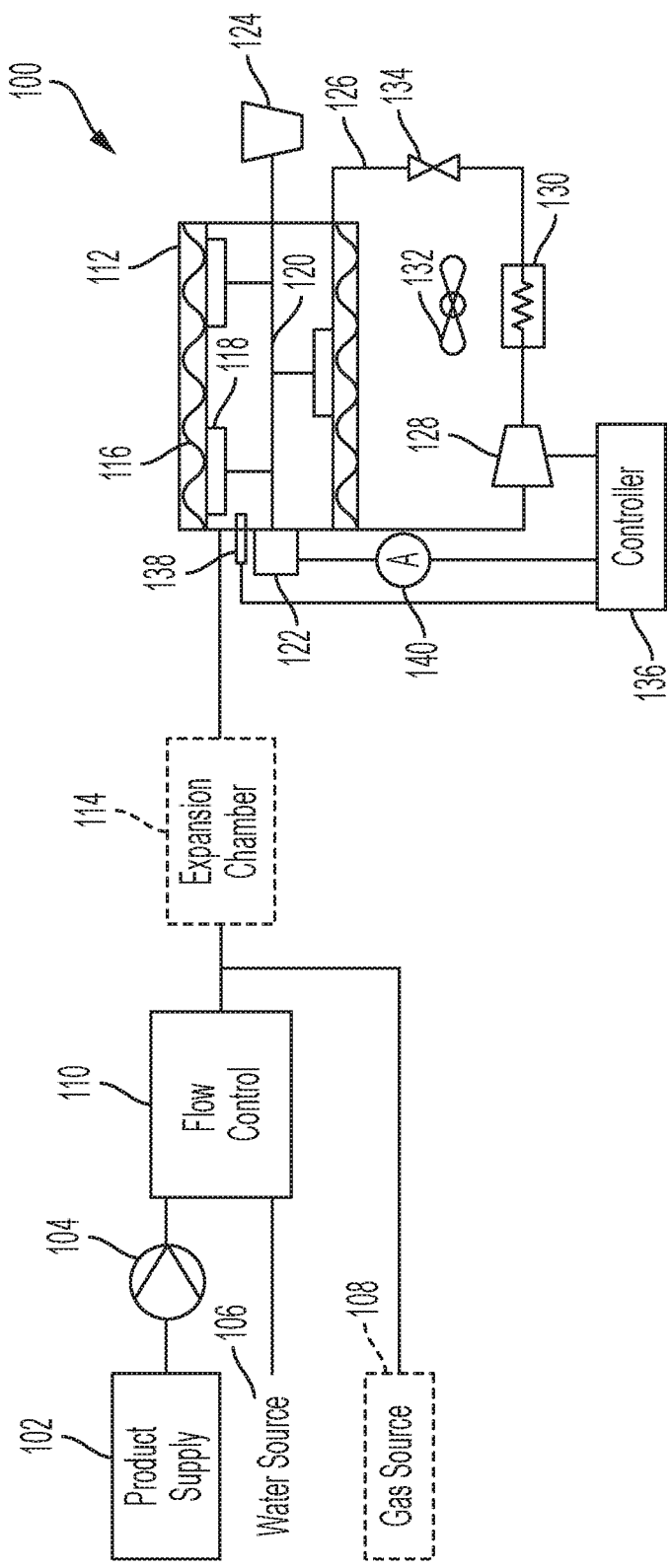
FIG. 1 is a system block diagram of an exemplary frozen product dispenser according to several aspects of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

Low Brix frozen beverage products (e.g., products with less than 10 degrees Brix) freeze harder and faster in a frozen product dispenser than standard Brix products (e.g., products with greater than 10 degrees Brix). Therefore, a viscosity of low Brix products in the frozen product dispenser may rapidly change and the scrapper blade of the dispenser may slip while trying to scrape ice off a product barrel of the frozen beverage dispenser.

Accordingly, the frozen product dispenser of the pending disclosure provides a controller adapted to control the rate of freezing in addition to the temperature range of the product. The controller is configured to monitor the temperature of the product as well as the torque applied to the scrapper blade. For example, the torque may be measured based on monitoring a current draw of a scrapper motor. Each measurement of the torque may be time stamped so as to track the torque over time and determine a rate of change in the torque. The rate of freezing may be controlled by setting a maximum rate of increase in the torque. Upon determining that the rate of increase in the monitored torque exceeds the maximum rate, a compressor for the frozen product dispenser may be turned off for a predetermined period of time.

In some implementations, rather than turning off the compressor upon determining that the rate of increase in the monitored torque exceeds the maximum rate, a hot gas bypass may be opened between the compressor and an evaporator. The relatively hot gas from the compressor increases the temperature of the evaporator and thereby reduces the rate of freezing of the product. Following the opening of the hot gas bypass, the compressor may additionally be turned off for a period of time.

In some implementations, rather than controlling the rage of freezing by tightly controlling the heat transfer rate through direct thermal contact between the evaporator and the product, an intermediary heat transfer fluid may be used. For example, the evaporator may be positioned within a heat transfer chamber filled with a glycol solution or other heat transfer fluid that is not susceptible to freezing at the evaporator operating temperatures. In this way, the evaporator may be controlled to cool the heat transfer fluid to a cooling temperature, which in turn cools the product in the frozen product dispenser. By decoupling direct thermal contact between the evaporator and the product in the frozen product dispenser, tight control of the temperature of the evaporator may not be required. The frozen product dispenser with the heat transfer fluid may additionally control the rate of freezing based on the torque measurements and/or using a hot gas bypass, as described above.

Referring now to the drawings, FIG. 1 is a system block diagram of an exemplary frozen product dispenser according to several aspects of the disclosure. Although the frozen product dispenser 100 as described herein is used in the context of a noncarbonated frozen product, it is understood that the invention is equally applicable to any type of frozen or partially frozen dispensable product or confection such as carbonated beverages, ice creams, yogurts, coffee drinks, and the like.

The product dispenser 100 may include a product supply 102 with a liquid product stored therein. For example, the product supply 102 may include product concentrate. The product supply 102 may provide a particular flavor, or brand of a product or a beverage flavoring, i.e., a cherry flavoring or the like. As described above, the product supply 102 may be carbonated or noncarbonated. The product supply 102 may be housed in any type of conventional storage structure such as a syrup tank, a bag-in-box, a figal, or similar types of containers. A pump 104 is fluidically coupled to the product supply 102 and configured to draw the product from the product supply 102. The pump 104 is generally positioned adjacent to the product supply 102 and may be of conventional design, such as a diaphragm pump, piston pump, gear pump, or any other suitable pump. The pump 104 and the product supply 102 may be positioned outside of a frame of the product dispenser 100 itself.

The product dispenser 100 also may include a water source 106 and optionally include a gas source 108. The water source 106 may be any type of potable water source, such as a water tank or municipal water supply. The gas source 108 may provide carbon dioxide gas or any type of compressed gas for carbonated beverages. The gas source 108 may be housed in any type of pressurized gas container. The gas source 108 may have a regulator (not shown) thereon so as to meter the flow of the gas. The gas source 108 and the regulator may be positioned outside of the frame of the product dispenser 100.

The product supply 102 and the water source 106 may be connected to a flow control device 110 positioned within the product dispenser 100. The flow control device 110 may contain a number of metering valves, such as volumetric valves or the like, to meter the appropriate amount of concentrate flow from the product supply 102 and the appropriate amount of water flow from the water source 106 so as to mix the desired product.

The flow control device 110 in turn may be connected to a product barrel 112. For carbonated beverages, an expansion chamber 114 may be positioned between the flow control device 110 and the product barrel 112. A fluid line between the flow control device 110 and the product barrel 112 may merge with a gas line in communication with the gas source 108 so as to introduce carbon dioxide or other types of gas into the fluid flow. The fluid and the carbon dioxide gas mix so as to form a carbonated beverage. The expansion chambers 114 then serves to reduce or balance the amount of pressure that may be in the fluid flow without the loss of the carbonation. The expansion chambers 114 may be of conventional design. Alternatively, a conventional carbonator tank may be used to mix the fluid flow with the gas flow as is known in the art.

In the example provided above, a product concentrate is provided by the product supply 102. In some implementations, a pre-mixed product may be provided by the product supply 102 and pumped with the pump 104 directly to the product barrel 112 or poured directly into the product barrel 112 from the product supply 102. Other variations are contemplated by this disclosure for accommodating other known configurations of frozen product dispensers.

The product barrel 112 may hold the product therein as is known by those skilled in the art. For example, for carbonated products, the incoming fluid is generally pressurized and the product barrel 112 will hold this pressure. The product barrel 112 also may be unpressurized depending upon the product used therein. The product barrel 112 may be a metal, plastic, or other rigid structure and may be at least partially enclosed with foam or other insulation. As described in more detail below, the product barrel 112 may be encircled by an evaporator line 116 so as to at least partially freeze the product therein.

Positioned within the product barrel 112 may be a scraper blade 118. The scrapper blade 118 rotates so as to prevent the product therein from freezing completely. The scraper blade 118 also may scrape the partially frozen product off of the interior surface of the barrel 112. In the example shown in FIG. 1, the scrapper blade 118 comprises a plurality of offset blade segments connected to a central shaft 120. Other scraper blade configurations and orientations are contemplated by this disclosure, such as an auger, screw, or the like. The scraper blade 118 is driven by a drive motor 122 for rotating within the product barrel 112 about the central shaft 120.

The product barrel 112 is in communication with a nozzle 124 such that the frozen product may be dispensed from the nozzle 124. For example, upon a consumer actuating a dispense button or lever (not shown), frozen product may be dispensed from the nozzle 124 of the product dispenser 110.

The product dispenser 100 also includes a refrigeration system 126 so as to at least partially freeze the product within the product barrel 112. The refrigeration system 126 may include a compressor 128 in fluid communication with a condenser 130. A fan 132 or another type of an air-moving device may cool the condenser 130 as is known in the art. In turn, the condenser 130 may be in fluid communication with an expansion valve 134. For example, the expansion valve 134 may be a capillary tube of a predetermined length.

The expansion valve 134 may be in fluid communication with the evaporator 116, which is positioned around the product barrel 112. In some implementations, the evaporator 116 may be shrink-fitted on to the outer surface of the product barrels 112. Each of the components of the refrigeration system 126 may be connected by a series of fluid lines.

A control unit 136 may control the operation of the product dispenser 100. The control unit 136 may include a microprocessor so as to control the refrigeration system 126 and other elements of the product dispenser 100 as a whole. The control unit 136 is programmed so as to accommodate moderating the rate of freezing of a product in the product barrel 112.

Specifically, the control unit 136 is configured to monitor the temperature of the product in the product barrel 112. The control unit 136 is also configured to monitor the rate of freezing of a product in the product barrel 112 by measuring a torque applied by the drive motor 122. For example, a temperature sensor 138, such as a thermistor or thermocouple, may be in thermal communication with the product in the product barrel 112 and configured to provide a measurement of the temperature to the control unit 136.

As the product in the product barrel 112 begins to freeze, the viscosity of the product increases. Accordingly, an amount of current drawn by the drive motor 122 to turn the scrapper blade 118 likewise increases. The control unit 136 is therefore configured to measure a torque applied by the drive motor 122 by measuring a current drawn by the drive motor via an ammeter 140. Other sensors for measuring a torque applied by the drive motor 122 are contemplated by this disclosure. The measured current provided by the ammeter 140 may be supplied to the control unit 136 as an analog or digital signal. In some implementations, the ammeter 140 may transform a measured current to a torque value provided by the drive motor 122 and supply the determined torque value to the control unit 136. A described in detail with reference to FIG. 2, using the measurements from the temperature sensor 138 and the ammeter 140, the control unit 136 turns the compressor 128 of the refrigeration system 126 on or off as needed to prevent a product from freezing.

The control unit 136 may be configured with a desired product temperature range, such as a lowest temperature and a highest temperature for the product to be dispensed from the product dispenser 100. In some implementations, the lowest temperature may be set depending on the product to be within a predetermined range of the freezing point of the product. The lowest temperature may be set to prevent complete freezing of the product within the product barrel 112. For low Brix products, the predetermined range will be closer to the freezing point of the product than for standard Brix products. For example, the lowest temperature for a low Brix product may be set to be within 1° C. of the freezing point of the product. In contrast, the lowest temperature for a standard Brix product may be set to be within 3° C. of the freezing point of the product. Other temperature ranges are contemplated by this disclosure.

The control unit 136 may be configured with a desired rate of freezing for a product. For example, the change in current draw as measured by the ammeter 140 over time may be set for a product. For a low Brix product the rate of freezing may be configured to be less than the rate of freezing used for a standard Brix product.

The control unit 136 may be configured to set the desired product temperature and the desired rate of freezing through a user interface (not show) on the product dispenser 100 or through programming the control unit 136 via an external programming device, such as a mobile phone or a dedicated service interface device carried by a service technician.

In use, syrup or other types of concentrate or product from the product supply 102 may be pumped via the pump 104 to the flow control device 110. Likewise, water from the water source 106 is provided to the flow control device 110. For carbonated products, the ingredients are mixed therein and then flow towards the expansion chamber 114. In the process, the fluid is mixed with carbon dioxide or other type of compressed gas from the gas source 108. The product then flows from the expansion chamber 114 to the barrel 112. For noncarbonated products, the mixed ingredients flow directly to the product barrel 112. The product is then partially frozen therein by the refrigeration system 126 while being mixed and rotated via the scraper blade 118. The frozen product is then served via the nozzle 124.

Figure 2:
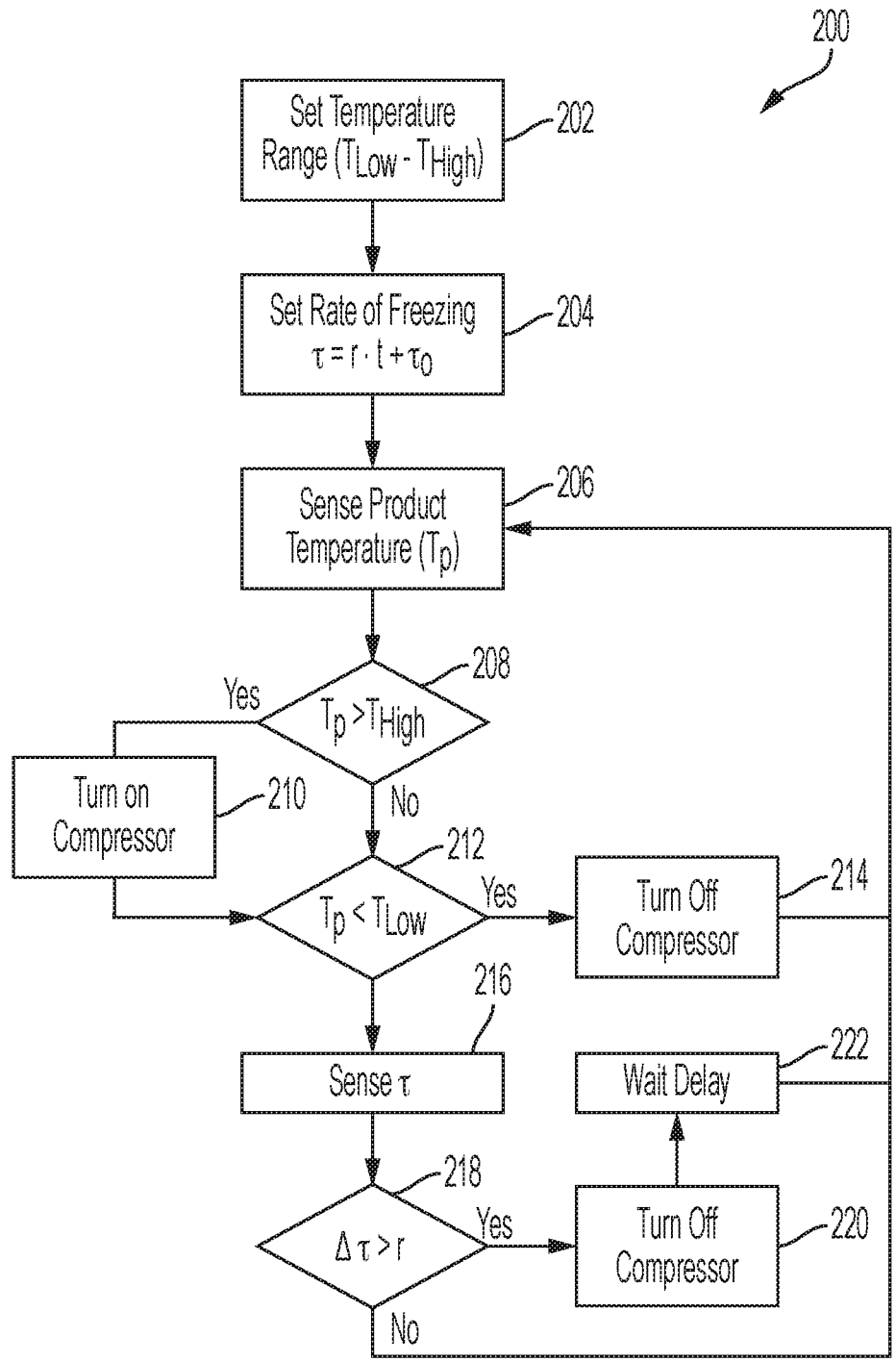
FIG. 2 is a flow diagram of the control algorithm for the frozen product dispenser of FIG. 1.

FIG. 2 is a flow diagram of the control algorithm 200 for the control unit 136 of the frozen product dispenser 100 of FIG. 1. At 202, the control unit 136 is configured to set the product temperature range. For example, the control unit 136 is configured to set a lowest temperature ($T_{Low}$) and a highest temperature ($T_{High}$) for the product to be dispensed from the product dispenser 100.

At 204, the control unit 136 is configured to set the freezing rate of the product. For example, the control unit 136 is configured to set a maximum rate of increase in torque provided by the drive motor 122. As noted above, as the product freezes in the product barrel 112, the viscosity increases, thereby leading to an increased torque applied by the drive motor 122 to turn the scrapper blade 118. In some implementations, the maximum rate of increase in torque is set as:

$$\tau = rt + \tau_0 \quad \text{Equation (1),}$$

where $\tau$ is the maximum torque at a given time, r is the configured rate of increase in torque, t is time, and $\tau_0$ is an initial torque applied by the drive motor 122. The values of r and $\tau_0$ may be configured at 204 depending on the product to be dispensed.

At 206, the control unit 136 senses a temperature ($T_P$) of the product in the product barrel 112 via the temperature sensor 138. At 208, the control unit 136 determines whether the sensed temperature of the product is greater than the highest temperature. If so, at 210, the control unit 136 instructs the compressor 128 to turn on.

Otherwise, at 212, the control unit 136 determines whether the sensed temperature of the product is less than the lowest temperature. If so, at 214, the control unit 136 instructs the compressor 128 to turn off and continues operation at 206, as described above. In some implementations, the control unit 136 may wait for a delay period after turning off the compressor 128 before proceeding to operation 206 so as to prevent short-cycling the compressor 128.

At 216, the control unit 136 senses the torque applied by the drive motor 122 via the ammeter 140. The control unit 136 may maintain a database of torque readings, each stored with a corresponding time stamp so as to track the change in torque over time. At 218, the control unit 136 determines whether the change in torque over time exceeds the configured rate of change for the torque. For example, the control unit 136 may determine a difference in two successive torque readings over a given period of time and determine whether the difference is greater than the configured rate of change in torque as normalized of the given period of time. Alternatively, the control unit 136 may solve Equation 1 for a given time and determine whether the sensed torque is greater than the torque calculated by Equation 1. Other variations in determining the rate of change for the torque are contemplated by this disclosure.

If the control unit 136 determines at 218 that the change in torque over time exceeds the configured rate of change for the torque, at 220, the control unit 136 instructs the compressor 128 to turn off 220. At 222, the control unit 136 waits for a configured delay period before proceeding back to 206. For example, the delay period may be set between 30 seconds to 2 minutes. Other delay periods are contemplated by this disclosure to limit the rate of change in freezing a product. In some implementations, the control unit 136 may instruct the compressor 128 to turn back on after 222.

Otherwise, if the control unit 136 determines at 218 that the change in torque over time does not exceed the configured rate of change for the torque, the control unit 136 proceeds back to 206.

Figure 3:
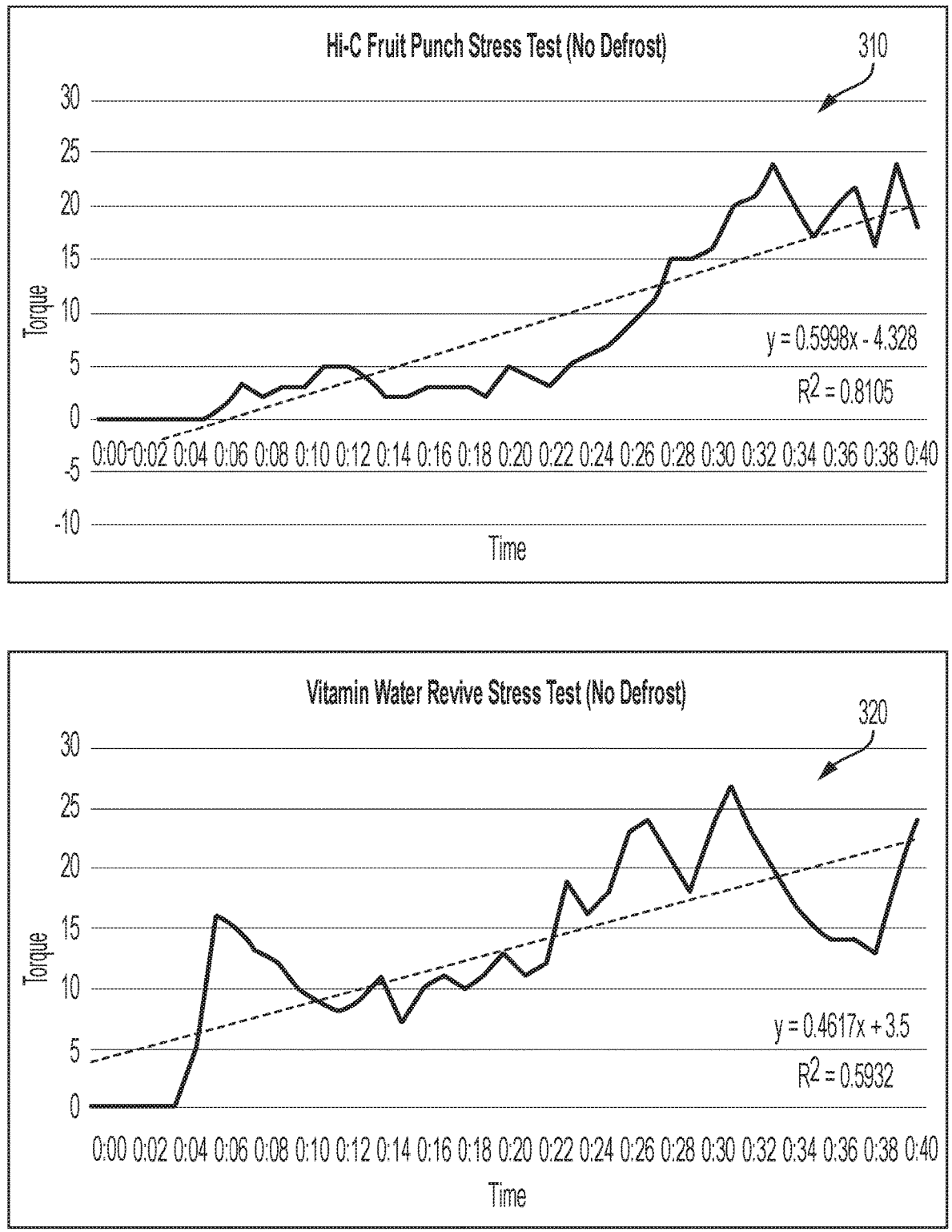
FIG. 3 shows graphs of experimental results comparing the torque of a frozen product dispenser with no defrost over time for a standard and low Brix solution.
Figure 4:
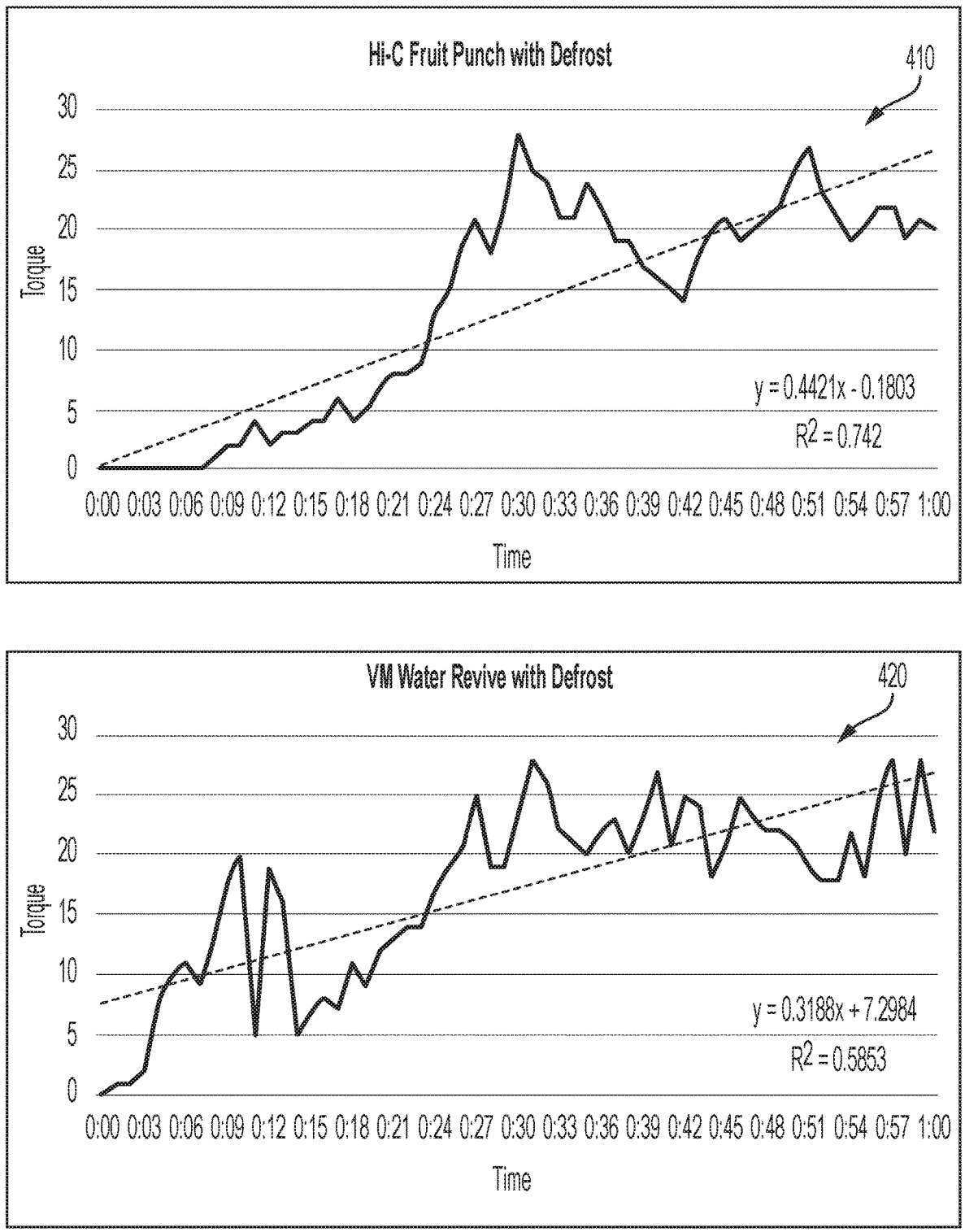
FIG. 4 shows graphs of experimental results comparing the torque of a frozen product dispenser with defrost over time for a standard and low Brix solution.

FIG. 3 shows graphs of experimental results comparing the torque of a frozen product dispenser with no defrost over time for standard and low Brix products. For example, the graph 310 shows the torque over time for a standard Brix product and the graph 320 shows the torque over time for a low Brix product. FIG. 4 shows graphs of experimental results comparing the torque of a frozen product dispenser with defrost over time for standard and low Brix products. For example, the graph 410 shows the torque over time for a standard Brix product and the graph 420 shows the torque over time for a low Brix product. In the examples provided in FIGS. 3 & 4, the standard Brix product has a Brix value of 10.9 and the low Brix product has a Brix value of 7.3.

As shown, the rate of freezing the low Brix solution is lower than the rate of freezing the standard Brix product. In some implementations, the rate of freezing the low Brix solution is between 70-80% the rate of freezing of the standard Brix solution. By limiting the rate of freezing of the low Brix solution, the frozen product dispenser is able to dispense a frozen slush product and prevent low- or no-calorie products from freezing into blocks of ice.

Figure 5:
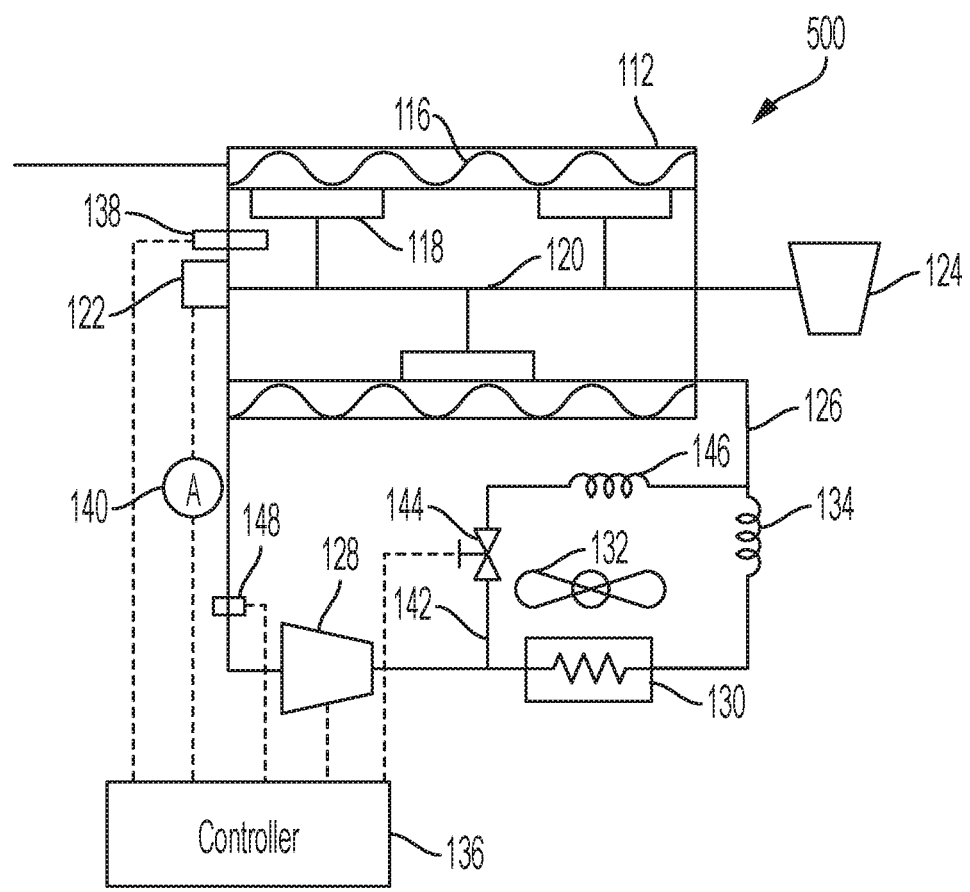
FIG. 5 is a system block diagram of an exemplary frozen product dispenser with a hot gas bypass according to several aspects of the disclosure.

FIG. 5 is a system block diagram of an exemplary frozen product dispenser 500 with a hot gas bypass 142 according to several aspects of the disclosure. The frozen product dispenser 500 is substantially similar to the frozen product dispenser 100 described above, with like numerals representing like parts. The frozen product dispenser 500 additionally includes a hot gas bypass 142 that is configured to selectively supply hot gas to the evaporator line 116 to increase the temperature of the evaporator line 116 and thereby reduce the rate of freezing of the product in the product barrel 112.

The hot gas bypass 142 comprises a shut-off valve 144 and an expansion valve 146. The shut-off valve 144 is configured to be selectively controlled by the control unit 136 to be in an open position or a closed position. In the closed position, the shut-off valve 144 prevents compressed refrigerant from the compressor 128 from passing through the shut-off valve 144. Instead, when the shut-off valve is in the closed position, refrigerant from the compressor 128 flows through the condenser 130 as described above. In the open position, the shut-off valve 144 allows compressed refrigerant from the compressor 128 to pass through the shut-off valve 144 and the expansion valve 146 to supply hot gas directly to the evaporator line 116 without first being cooled through the condenser 130. In other words, the hot gas bypass 142 bypasses the condenser 130. The expansion valve 146 may be a capillary tube or other expansion valve configured to reduce the pressure of the hot gas. In various implementations, the expansion valve 146 may provide more, less, or an equal amount of pressure drop as the expansion valve 134.

By increasing the temperature of the evaporator line 116, the hot gas bypass 142 operates to selectively inject heat into the product in the product barrel 112, thereby reducing the rate of freezing of the product. A temperature sensor 148, such as a thermistor or thermocouple, is positioned on at an outlet of the evaporator line 116 and configured to measure a temperature at the outlet of the evaporator line 116. The temperature sensor 148 is configured to supply a signal to the control unit 136 indicative of the temperature of the outlet of the evaporator line 116. Upon the temperature of the outlet of the evaporator line 116 exceeding a threshold evaporator temperature, the control unit 136 is configured to turn off the hot gas bypass 142 by instructing the shut-off valve 144 to be in the closed position. For example, the threshold evaporator temperature may be within 1-3° C. above or below the freezing point temperature of the product. Other threshold evaporator temperatures may be used.

In some implementations, the compressor 128 may additionally be turned off upon the temperature of the outlet of the evaporator line 116 exceeding the threshold evaporator temperature.

Figure 6:
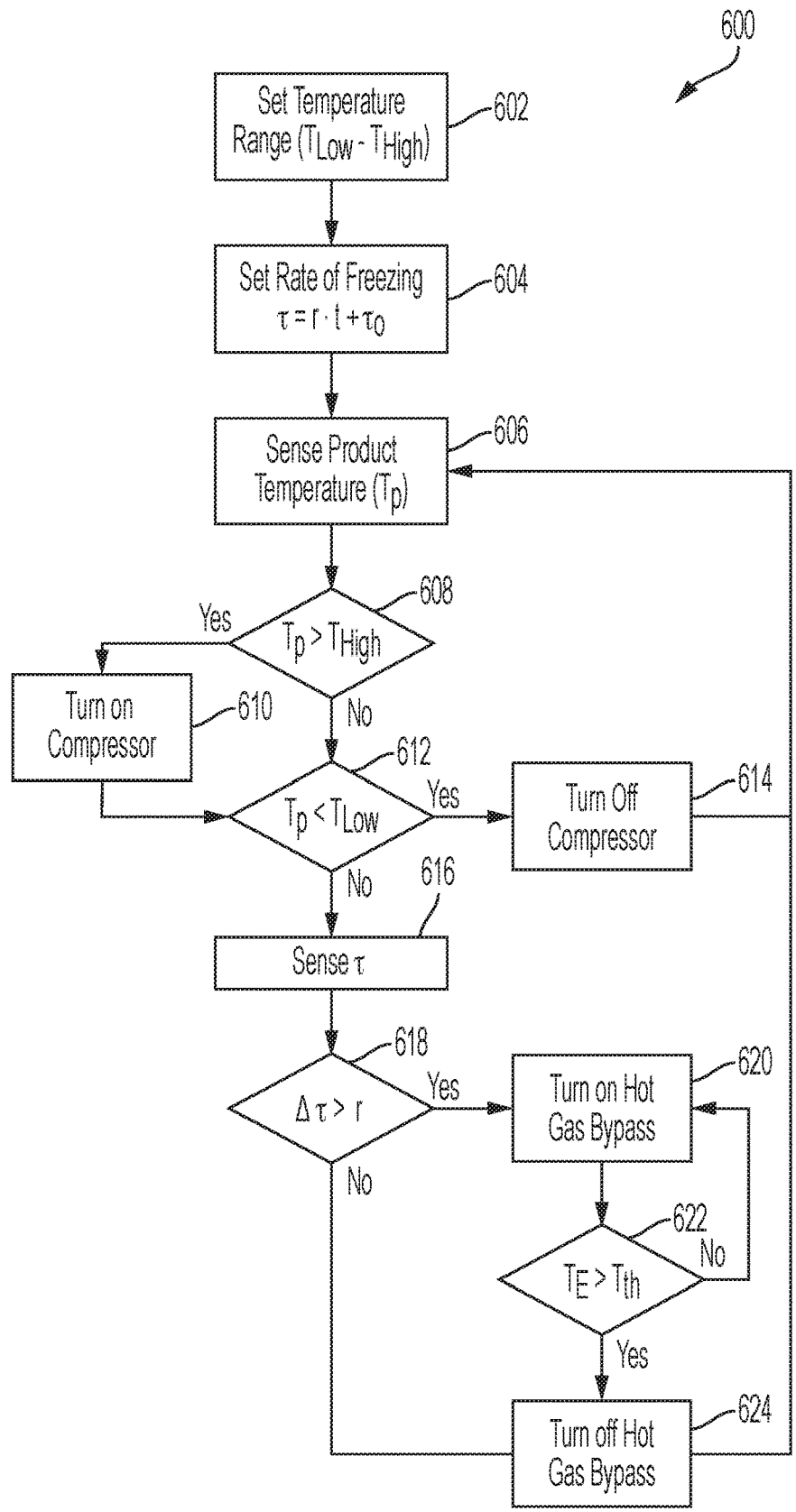
FIG. 6 is a flow diagram of the control algorithm for the frozen product dispenser of FIG. 5.

FIG. 6 is a flow diagram of the control algorithm 600 for the control unit 136 of the frozen product dispenser 500 of FIG. 5. At 602-618, the control unit 136 operates substantially the same as in 202-218, described above.

If the control unit 136 determines at 618 that the change in torque over time exceeds the configured rate of change for the torque, at 620, the control unit 136 turns on the hot gas bypass 142 by instructing the shut-off valve 144 to open. Accordingly, hot compressed gas output from the compressor 128 is supplied through the shut-off valve 144 and expansion valve 146 to the evaporator line 116, thereby increasing the temperature of the evaporator line 116.

At 622, the control unit 136 receives a signal from the temperature sensor 148 indicative of a temperature of the outlet of the evaporator line 116. The control unit 136 determines whether the temperature of the outlet of the evaporator line 116 exceeds the threshold evaporator temperature. If not, the shut-off valve 144 remains open to continue to supply hot gas to the evaporator line 116. Otherwise, upon the temperature of the outlet of the evaporator line 116 exceeding the threshold evaporator temperature, the control unit 136 turns off the hot gas bypass 142 at 624 by instructing the shut-off valve 144 to close. In some implementations, the control unit 136 may additionally instruct the compressor 128 to turn off for a predetermined period of time.

Otherwise, if the control unit 136 determines at 618 that the change in torque over time does not exceed the configured rate of change for the torque, the control unit 136 proceeds back to 606.

Figure 7:
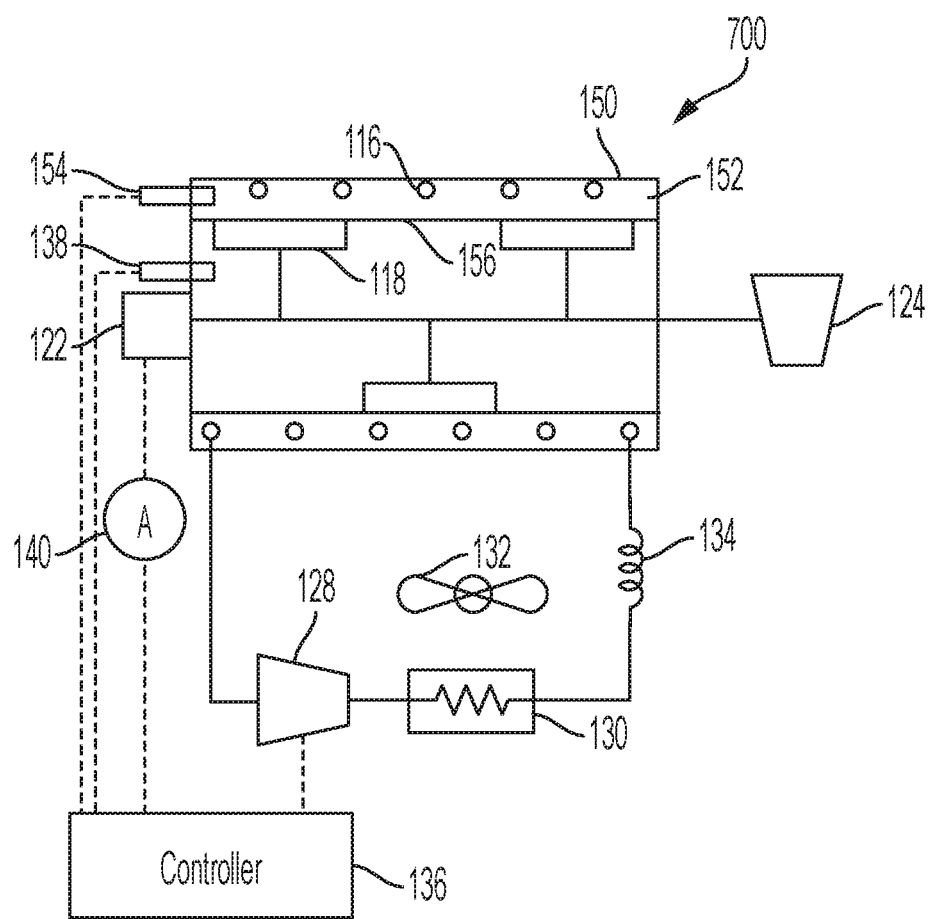
FIG. 7 is a system block diagram of an exemplary frozen product dispenser with a thermal conduction barrier according to several aspects of the disclosure.

FIG. 7 is a system block diagram of an exemplary frozen product dispenser 700 with a thermal conduction barrier according to several aspects of the disclosure. The frozen product dispenser 700 is substantially similar to the frozen product dispenser 100 described above, with like numerals representing like parts. The frozen product dispenser 700 additionally includes a heat transfer chamber 150 with a heat transfer fluid 152 positioned therein. In the example shown, the evaporator line 116 is shown to pass through the heat transfer chamber 150 without making direct thermal contact with a heat transfer surface 156 of the product barrel 112. Instead, heat is indirectly transferred between the heat transfer surface 156 and the evaporator line 116 via the intervening heat transfer fluid 152. In use, the heat transfer surface 156 of the product barrel 112 is in intimate contact with a product provided in the product barrel 112 and configured to cool the product therein. In some implementations, the evaporator line 116 may be positioned outside of the heat transfer chamber 150.

The heat transfer fluid 152 acts as an intermediary heat transfer medium between the evaporator line 116 and the heat transfer surface 156. The heat transfer fluid 152 may be a glycol solution or other heat transfer fluid that is not susceptible to freezing at the evaporator line 116 operating temperatures. For example, the evaporator line 116 may have a temperature of −10° C. or lower, well below a freezing point of a product in the product barrel 112. The heat transfer fluid 152 has a freezing temperature below the operating temperature of the evaporator line 116. In some implementations, the heat transfer fluid 152 may be a gel or solid material, such as an aluminum block.

A temperature sensor 154, such as a thermistor or thermocouple, is positioned to measure a temperature of the heat transfer fluid 152. The temperature sensor 154 is configured to supply a signal to the control unit 136 indicative of the temperature of the heat transfer fluid 152.

The control unit 136 is configured to control the refrigeration system 126 in order to maintain the heat transfer fluid 152 at a predetermined cooling temperature. The cooling temperature is a temperature that the product in the product barrel 112 is exposed to via the heat transfer surface 156. For example, the control unit 136 is configured to cycle operation of the compressor 128 so as to maintain the heat transfer fluid 152 at the cooling temperature. Upon the temperature sensor 154 measuring a temperature of the heat transfer fluid 152 to be above the cooling temperature, the control unit 136 controls the refrigeration system 126 to turn on to cool the heat transfer fluid 152. Upon the temperature sensor 154 measuring a temperature of the heat transfer fluid 152 to be below the cooling temperature, the control unit 136 controls the refrigeration system 126 to turn off to maintain the heat transfer fluid 152 at the cooling temperature. Upon turning off the refrigeration system 126, the control unit 136 may wait for a predetermined period of time before turning the refrigeration system 126 back on so as to avoid short-cycling the compressor 128. The cooling temperature may be a function of time or product temperature.

For example, the control unit 136 may operate to maintain the heat transfer fluid 152 at a minimum temperature for a first period of time when the product is first introduced into the product barrel 112. For example, the minimum temperature may be the operating temperature of the evaporator line 116. Providing the minimum temperature for the first period of time minimizes the pull-down time when new product is loaded into the product barrel 112. After the first period of time, the cooling temperature may be raised as a function of time over a second period of time to limit the freezing rate of the product. For example, over the second period of time, the cooling temperature may be raised on a linear basis, a non-linear basis, or some other basis with time. At the end of the second period of time, the cooling temperature will be at a maximum temperature. For example, the maximum temperature may be at the freezing point of the product or within a threshold temperature of the freezing point of the product (e.g., 1-3° C.). The cooling temperature may be maintained at the maximum temperature so as to keep the product in the product barrel 112 at a desired freezing temperature to be maintained as a slush or frozen slurry. For example, the maximum temperature may be the set point temperature for the product.

In another example, the control unit 136 may operate to maintain the heat transfer fluid 152 at the minimum temperature until the product temperature sensor 138 measures that the product has reached a first threshold temperature. Upon reaching the first threshold temperature, the cooling temperature may be raised as a function of the product temperature as measured by the temperature sensor 138 to limit the freezing rate of the product. For example, the cooling temperature may be raised on a linear basis, a non-linear basis, or some other basis with the temperature measured by the temperature sensor 138 until reaching the maximum temperature. Upon reaching the maximum temperature, the control unit may operate to maintain the heat transfer fluid at the maximum temperature.

By decoupling direct thermal contact between the evaporator and the product in the frozen product dispenser, tight control of the temperature of the evaporator line 116 may not be required. Therefore, the frozen product dispenser 700 is more resilient to maintenance conditions of the refrigeration system 126, such as a dirty condenser 130, which may otherwise impact the temperature of the evaporator line 116.

Other variations for controlling the cooling temperature may be used. For example, the cooling temperature may simply be maintained at the maximum temperature at all times so as to limit the freezing rate of the product. Other variations to the frozen product dispenser 700 are contemplated, such as to additionally control the rate of freezing based on the torque measurements and/or using a hot gas bypass, as described above.

Figure 8:
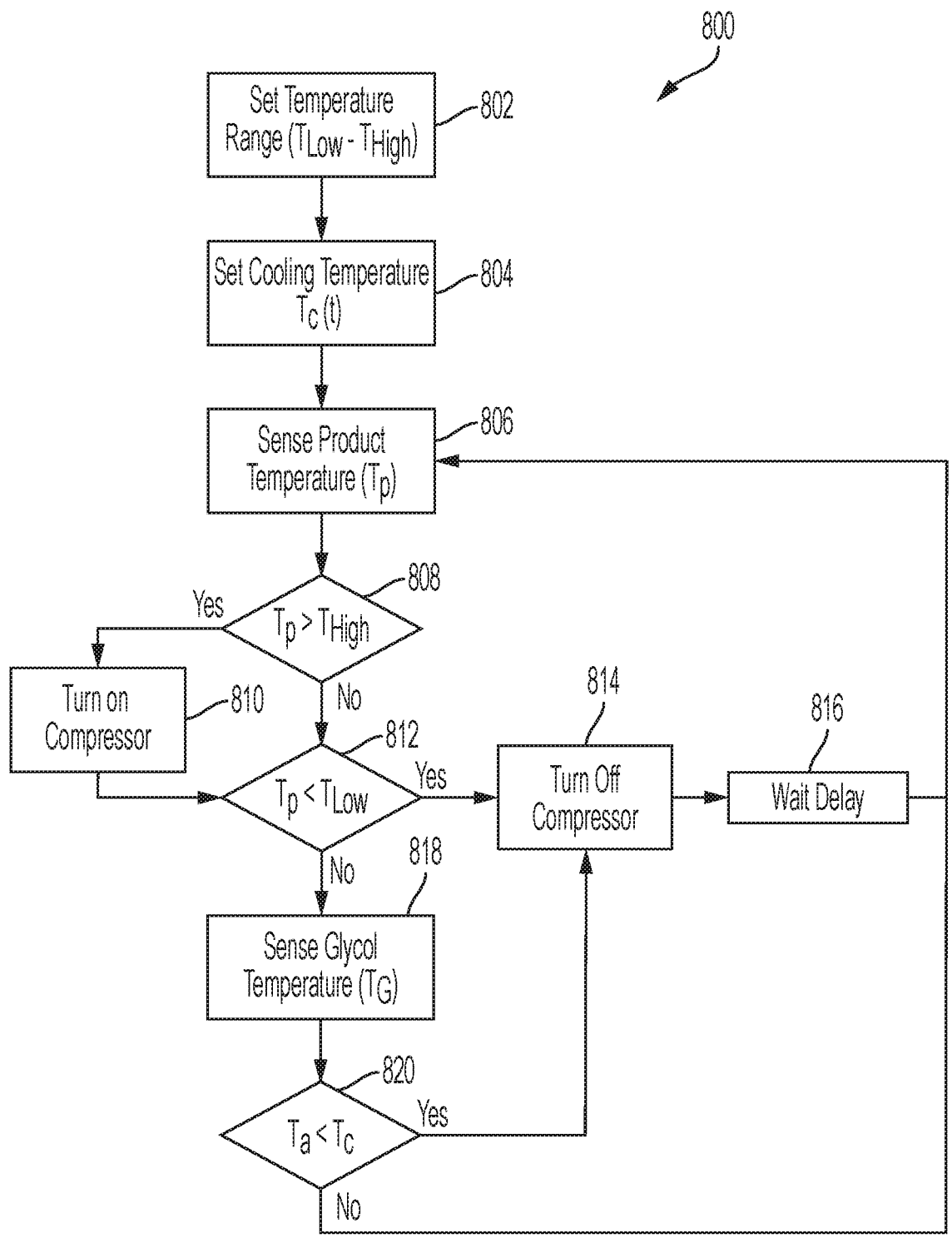
FIG. 8 is a flow diagram of the control algorithm for the frozen product dispenser of FIG. 7.

FIG. 8 is a flow diagram of the control algorithm 800 for the frozen product dispenser of FIG. 7. At 802 and 806-814, the control unit 136 operates substantially the same as in 202 and 206-214, described above. At 804, the control unit 136 is configured to set the cooling temperature for the product. For example, the control unit 136 is configured to set the cooling temperature as a function of time or temperature of the product.

At 818, the control unit 136 senses the temperature of the heat transfer fluid 152, such as a glycol solution, via the temperature sensor 154. At 820, the control unit 136 determines whether the temperature of the heat transfer fluid 152 is less than the cooling temperature configured at 804. If the control unit 136 determines that the temperature of the heat transfer fluid 152 is less than the cooling temperature, the control unit 136 instructs the compressor to turn off at 814. After waiting for a predetermined delay period at 816, the control algorithm progresses back to 806. Otherwise, if the control unit 136 determines that the temperature of the heat transfer fluid 152 is not less than the cooling temperature, the control algorithm progresses back to 806. Other variations of the control algorithm 800 are contemplated by this disclosure. For example, instead of or in addition to turning off the compressor 814, a hot gas bypass may be turned on to raise the temperature of the evaporator line 116 so as to maintain the temperature of the heat transfer fluid 152 at the cooling temperature.

It should be appreciated that the logical operations described herein with respect to the various figures may be implemented (1) as a sequence of computer implemented acts or program modules (i.e., software) running on a computing device (e.g., the computing device described in FIG. 9), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 9:
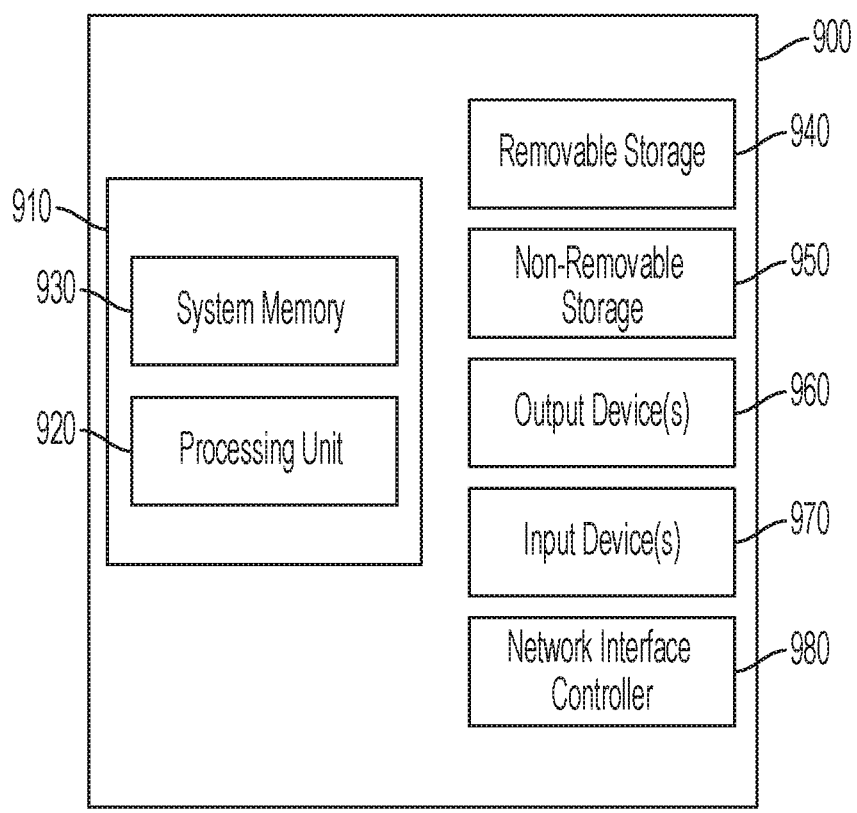
FIG. 9 illustrates an exemplary computer system suitable for implementing the several embodiments of the disclosure.

Referring to FIG. 9, an example computing device 900 upon which embodiments of the invention may be implemented is illustrated. For example, the control unit 136 may be implemented as a computing device, such as computing device 900 programmed to implement any of the control algorithms shown and describe with reference to FIGS. 2, 6, and 8. It should be understood that the example computing device 900 is only one example of a suitable computing environment upon which embodiments of the invention may be implemented. Optionally, the computing device 900 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 900 to provide the functionality of a number of servers that is not directly bound to the number of computers in the computing device 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 900 typically includes at least one processing unit 920 and system memory 930. Depending on the exact configuration and type of computing device, system memory 930 may be volatile (such as random access memory (RAM)), non-volatile (such as read-only memory (ROM), flash memory, etc.), or some combination of the two. This most basic configuration is illustrated in FIG. 9 by dashed line 910. The processing unit 920 may be a standard programmable processor that performs arithmetic and logic operations necessary for operation of the computing device 900. While only one processing unit 920 is shown, multiple processors may be present. Thus, while instructions may be discussed as executed by a processor, the instructions may be executed simultaneously, serially, or otherwise executed by one or multiple processors. The computing device 900 may also include a bus or other communication mechanism for communicating information among various components of the computing device 900.

Computing device 900 may have additional features/ functionality. For example, computing device 900 may include additional storage such as removable storage 940 and non-removable storage 950 including, but not limited to, magnetic or optical disks or tapes. Computing device 900 may also contain network connection(s) 980 that allow the device to communicate with other devices such as over the communication pathways described herein. The network connection(s) 980 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 900 may also have input device(s) 970 such as a keyboards, keypads, switches, dials, mice, track balls, touch screens, voice recognizers, card readers, paper tape readers, or other well-known input devices. Output device(s) 960 such as a printers, video monitors, liquid crystal displays (LCDs), touch screen displays, displays, speakers, etc. may also be included. The additional devices may be connected to the bus in order to facilitate communication of data among the components of the computing device 900. All these devices are well known in the art and need not be discussed at length here.

The processing unit 920 may be configured to execute program code encoded in tangible, computer-readable media. Tangible, computer-readable media refers to any media that is capable of providing data that causes the computing device 900 (i.e., a machine) to operate in a particular fashion. Various computer-readable media may be utilized to provide instructions to the processing unit 920 for execution. Example tangible, computer-readable media may include, but is not limited to, volatile media, non-volatile media, removable media and non-removable media implemented in any method or technology for storage of information such as computer readable instructions, data structures, program modules or other data. System memory 930, removable storage 940, and non-removable storage 950 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 920 may execute program code stored in the system memory 930. For example, the bus may carry data to the system memory 930, from which the processing unit 920 receives and executes instructions. The data received by the system memory 930 may optionally be stored on the removable storage 940 or the non-removable storage 950 before or after execution by the processing unit 920.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A frozen product dispenser, comprising:
   a product barrel configured to receive a product solution;
   a refrigeration system coupled to the product barrel and configured to cool the product solution within the product barrel;
   a temperature sensor configured to measure a temperature of the product solution within the product barrel;
   a drive motor configured to rotate a scrapper blade within the product barrel;
   a torque sensor configured to measure a torque applied by the drive motor; and
   a control unit configured to control operation of the refrigeration system based on the measured temperature and the measured torque, and
   wherein the control unit is configured to control operation of a compressor of the refrigeration system and the control unit is further configured to turn off the compressor and/or open a hot gas bypass of the refrigeration system when a determined rate of change in the measured torque exceeds a configured rate of change, wherein the configured rate of change of torque is calculated from an initial torque applied by the drive motor and a maximum torque over a period of time.

2. The frozen product dispenser of claim 1, wherein the control unit is configured to limit a rate of change of the measured torque to a configured rate of change in torque.

3. The frozen product dispenser of claim 1, wherein the control unit is configured to limit a rate of change of freezing the product solution within the product barrel to a configured rate of change of freezing.

4. The frozen product dispenser of claim 1, wherein the torque sensor is a current sensor configured to measure an amount of current drawn by the drive motor.

5. The frozen product dispenser of claim 1, wherein the control unit is configured to wait for a configured delay period after turning off the compressor.

6. The frozen product dispenser of claim 5, wherein the hot gas bypass is configured to supply gas output from the compressor to an input of an evaporator line.

7. The frozen product dispenser of claim 6, wherein the hot gas bypass comprises a shut-off valve configurable between an open and closed position, wherein the control unit is configured to instruct the shut-off valve to open or close based on the measured torque.

8. The frozen product dispenser of claim 7, wherein the refrigeration system further comprises a temperature sensor on the evaporator line, wherein the control unit is configured to instruct the shut-off valve to close upon a determination that a temperature measured by the temperature sensor on the evaporator line exceeds a threshold temperature.

9. The frozen product dispenser of claim 1, wherein the product solution has a Brix value less than 10.

10. A method of controlling a frozen product dispenser, comprising:
    operating a refrigeration system to cool a product solution in a product barrel;
    operating a drive motor to rotate a scrapper blade within the product barrel;
    measuring, by a temperature sensor, a temperature of the product solution within the product barrel;
    measuring, by a torque sensor, a torque applied by the drive motor; and
    controlling, by a control unit of the frozen product dispenser, operation of the refrigeration system based on the measured temperature and the measured torque,
    wherein controlling operation of the refrigeration system comprises controlling operation of a compressor of the refrigeration system, wherein controlling operation of the refrigeration system further comprises turning off the compressor and/or opening a hot gas bypass of the refrigeration system when a determined rate of change in the measured torque exceeds a configured rate of change, wherein the configured rate of change of torque is calculated from an initial torque applied by the drive motor and a maximum torque over a period of time.

11. The method of claim 10, wherein the control unit is configured to limit a rate of change of the measured torque to a configured rate of change in torque.

12. The method of claim 10, wherein the control unit is configured to limit a rate of change of freezing the product solution within the product barrel to a configured rate of change of freezing.

13. The method of claim 10, wherein the torque sensor is a current sensor configured to measure an amount of current drawn by the drive motor.

14. The method of claim 10, wherein controlling operation of the refrigeration system further comprises waiting for a configured delay period after turning off the compressor.

15. The method of claim 14, wherein controlling operation of the refrigeration system comprises controlling operation of the hot gas bypass to supply gas output from the compressor to an input of an evaporator line.

16. The method of claim 15, wherein controlling operation of the hot gas bypass comprises instructing a shut-off valve to open based on the measured torque.

17. The method of claim 16, wherein controlling operation of the hot gas bypass further comprises instructing the shut-off valve to close based on a measured temperature of the evaporator line exceeding a threshold temperature.

18. The method of claim 10, further comprising selecting, by a user interface, the product solution and a selected rate of freezing, wherein the configured rate of change of torque corresponds to the selected rate of freezing of the product solution.

19. The method of claim 10, wherein the product solution has a Brix value less than 10.

* * * * *